(12) United States Patent
Merkle et al.

(10) Patent No.: US 8,029,045 B2
(45) Date of Patent: Oct. 4, 2011

(54) CROSSBEAM FOR A MOTOR VEHICLE

(75) Inventors: Hans Merkle, Docklands (AU);
Romaric Jonckheere,
Illkirch-Graffenstaden (FR); Stephan Kasper, Oberkirch (DE); Hansjoerg Schmieder, Oberkirch-Zusenhofen (DE)

(73) Assignee: Progress-Werk Oberkirch AG, Oberkirch (DE)

( * ) Notice: Subject to any disclaimer, the term of this patent is extended or adjusted under 35 U.S.C. 154(b) by 108 days.

(21) Appl. No.: 12/535,134

(22) Filed: Aug. 4, 2009

(65) Prior Publication Data

US 2010/0032228 A1 Feb. 11, 2010

(30) Foreign Application Priority Data

Aug. 5, 2008 (DE) .................. 10 2008 036 824

(51) Int. Cl.
*B62D 21/00* (2006.01)

(52) U.S. Cl. .................. 296/193.02; 296/70; 296/72

(58) Field of Classification Search ............ 296/70, 296/193.02, 203.02, 72, 194, 71; 280/779, 280/780, 752, 750, 775, 776; 180/90; *B62D 21/00*
See application file for complete search history.

(56) References Cited

U.S. PATENT DOCUMENTS

| 5,868,426 | A | 2/1999 | Edwards et al. |
| 6,391,470 | B1 * | 5/2002 | Schmieder et al. ............ 428/598 |
| 6,523,878 | B2 * | 2/2003 | Scheidel ......................... 296/70 |
| 6,644,690 | B2 * | 11/2003 | Brownlee et al. ............. 280/779 |
| 6,851,742 | B1 * | 2/2005 | Kubiak ..................... 296/193.02 |
| 2004/0135400 | A1 * | 7/2004 | Matsuzaki et al. ........ 296/193.02 |

FOREIGN PATENT DOCUMENTS

DE 601 02 312 2/2005

* cited by examiner

*Primary Examiner* — Glenn Dayoan
*Assistant Examiner* — Sunsurraye Westbrook
(74) *Attorney, Agent, or Firm* — Marshall, Gerstein & Borun LLP

(57) ABSTRACT

A crossbeam for a motor vehicle comprises a crossbeam body and at least one attachment device for attaching at least one vehicle component of the motor vehicle to the crossbeam, the attachment device having an attachment body which is fastened to the crossbeam body and extends in the longitudinal direction of the crossbeam body over a partial length of the crossbeam body and away from the crossbeam body in a direction transverse to the longitudinal direction, and a plurality of attachment elements being present on the attachment body. The attachment body is built up from a plurality of individual blanks which are fastened to the crossbeam body in a distributed manner over the partial length and which each extend with their longitudinal direction and with their blank area transversely to the longitudinal direction of the crossbeam body.

12 Claims, 4 Drawing Sheets

CROSSBEAM FOR A MOTOR VEHICLE

CROSS-REFERENCE TO FOREIGN APPLICATION

The present application claims priority of German Patent Application No. 10 2008 036 824.5 filed on Aug. 5, 2008.

BACKGROUND OF THE INVENTION

The invention generally relates to crossbeams for motor vehicles.

More specifically, the invention relates to a crossbeam for a motor vehicle, comprising a crossbeam body and at least one attachment device for attaching the crossbeam to at least one vehicle component of the motor vehicle, the attachment device having an attachment body which is fastened to the crossbeam and extends in the longitudinal direction of the crossbeam body over a partial length of the crossbeam body and away from the crossbeam body in a direction transverse to the longitudinal direction, and a plurality of attachment elements being present on the attachment body.

Crossbeams are used in the automobile industry in the body structure. As a part of a motor vehicle body, the crossbeam is arranged between the so-called A-pillars in the region below the windscreen, running approximately horizontally. The crossbeam is used to fasten the instrument panel, while also stiffening the instrument panel, which usually consists of plastics and/or wooden parts. The crossbeam has a crossbeam body which usually consists of a tube or generally of one or more profiles.

A plurality of attachment devices for attaching the crossbeam to various vehicle components of the motor vehicle are usually present on the crossbeam body of a crossbeam. For example, an attachment device for attaching the crossbeam to the two A-pillars is located at each end of the crossbeam body. In addition, an attachment device for attaching the centre console to the crossbeam and an attachment device for attaching the steering column to the crossbeam are located between the two ends of the crossbeam body.

Without restricting its universality, the present invention is described with reference to an attachment device for attaching the steering column to the crossbeam. However, the invention can also be applied to other attachment devices on such a crossbeam.

In the case of an attachment device for attaching the steering column to the crossbeam, the attachment device has an attachment body which is fastened on one side to the crossbeam body and extends thereon in the longitudinal direction of the crossbeam body over partial length thereof, and extends away from the crossbeam body in a direction transverse to the longitudinal direction thereof. Accordingly, the attachment body has a three-dimensional form.

In known crossbeams the attachment body of the attachment device for the steering column is produced substantially in one piece as an aluminium diecasting or a magnesium diecasting. In accordance with the factors dependent on the vehicle type, the attachment body in the form of the aluminium diecasting has a relatively complex geometrical structure.

Although such an aluminium diecasting has the advantage of low weight, it has the disadvantage that it is very expensive to produce. A further disadvantage of such an aluminium diecasting as the attachment device is that, in the event of model changes of the motor vehicle which are reflected in design changes, even when small, in the region of the connection of the steering column to the crossbeam, the aluminium diecasting cannot be adapted simply to the new conditions, but a differently shaped aluminium diecasting must be produced, entailing additional cost and expenditure of time, especially in the production of a new diecasting mould. In other words, an attachment device in the form of an aluminium diecasting is not flexible in the event of changes to its installed situation in the motor vehicle.

Other crossbeams are known in which the attachment device for attaching the steering column to the crossbeam is made of one or more sheet metal parts instead of an aluminium diecasting, which sheet metal parts have been shaped in several shaping processes to form the desired three-dimensional structure. In this case there is, firstly, the disadvantage that such three-dimensionally shaped sheet steel parts have relatively high weight and, secondly, the disadvantage that, like the aluminium diecasting, they are expensive to produce since a large number of shaping processes are required, necessitating a corresponding number of shaping tools, until the finished attachment device is produced. Moreover, in this case, too, there is very little flexibility in the event of changes to the installed situation.

SUMMARY OF THE INVENTION

It is the object of the invention to develop a crossbeam of the type mentioned in the introduction in such a manner that the crossbeam can be produced with low weight and at low cost and is flexible with respect to changes to the installed situation.

According to the invention, a crossbeam for a motor vehicle is provided, comprising
- a crossmember body having a longitudinal axis,
- at least one attachment device arranged at the crossmember body for attaching at least one vehicle component of the motor vehicle to the crossbeam,
- the attachment device having an attachment body fastened to the crossbeam body and extending in direction of the longitudinal axis of the crossmember body over a partial length of the crossmember body and away from the crossmember body in direction transverse to the longitudinal axis,
- a plurality of attachment elements arranged on the attachment body,
- wherein the attachment body is built up from a plurality of individual blanks which are fastened to the crossbeam body in a distributed manner over the partial length, each of the blanks having a blank area extending transversely to the longitudinal axis of the crossbeam body.

Accordingly, the at least one attachment device of the crossbeam according to the invention has an attachment body the three-dimensional structure of which is created by a plurality of blanks as basic elements and which, in other words, comprises a ribbed structure. In the present context a blank should be understood to mean a part with a low material thickness of less than 1 cm, preferably in the range from 0.5 mm to 5 mm. The individual blanks are fastened to the crossbeam body in a manner distributed over the partial length of the crossbeam body over which the attachment device extends, so that the individual blanks extend with their longitudinal direction and their blank area transversely to the longitudinal direction of the crossbeam body. In other words, the blanks are fixed side-by-side to the crossbeam. Unlike the attachment bodies of the attachment devices of the known crossbeams, the three-dimensional structure of the attachment body of the attachment device does not have a closed structure in the longitudinal direction of the crossbeam but an open structure which advantageously has low weight. In addition, the individual blanks can be produced at low cost, for example, as is provided in a preferred configuration, as punched parts, and the fastening of the individual blanks to the crossbeam body is possible with widely used joining methods (for example bonding, crimping, welding, screwing, etc.). In addition, the configuration of the inventive crossbeam with an attachment device built up from a plurality of individual blanks proves to be very flexible with respect to changes to the installed situation. In order to react to changed attachment points, for example of the steering column, to the inventive crossbeam, it is necessary only to displace the individual blanks slightly in the longitudinal direction of the crossbeam body or to produce blanks with different profiles.

In a preferred configuration, each blank is fastened individually to the crossbeam body.

While it is also possible within the scope of the invention for two blanks, for example, to be connected to one another at one end in a U-shape, this measure has the advantage that the distance between two neighbouring blanks in the longitudinal direction of the crossbeam body can be varied without difficulty, whereby the flexibility of the attachment device of the inventive crossbeam is further increased.

In a further preferred configuration the blanks are spaced from one another in the longitudinal direction of the crossbeam body.

The spacing may be equal from blank to blank, but may also be selected differently from blank to blank. The latter spacing can, for example, serve advantageously to prevent resonance affects while the motor vehicle is being driven. The spacing of the blanks from one another is, on the one hand, selected small enough to ensure sufficient strength of the attachment body built up from the blanks and, on the other, is selected as large as possible in order to build up the whole attachment body with as few blanks as possible, and thus to achieve a weight of the attachment device as low as possible.

In a further preferred configuration at least one attachment element of the attachment elements is fastened to two neighbouring blanks in a gap between the two blanks.

The ribbed structure created by the construction of the attachment body from individual blanks is now very advantageously suited to mounting the individual attachment elements on the attachment body, in that the individual attachment elements are arranged in the gaps between two neighbouring blanks in each case and are connected to the two blanks by a material joint, for example by bonding, welding, riveting and the like. These attachment elements, which may preferably have a rigid configuration, have not only the function of receiving connecting means such as screws or the like, but at the same time also contribute to the fixing and stiffening of the individual blanks in a direction transverse to their longitudinal direction, and therefore contribute to the overall stiffening and consequently the high mechanical load capacity of the attachment body.

In a further preferred configuration at least two neighbouring blanks are connected to one another at their free ends oriented away from the crossbeam body by at least one rigid linking element.

If the blanks are fastened to the crossbeam body by one end, they have only one free end, which free ends are connected to one another by one or more rigid linking elements so that transverse forces acting on the individual blanks do not cause deformation of the attachment body. If the individual blanks are fastened to the crossbeam body in a middle region with respect to their longitudinal direction (i.e. in direction transverse to the longitudinal direction of the crossbeam), such rigid linking elements are preferably provided at both free ends of the individual blanks.

In this connection it is preferred if the at least one linking element is one of the attachment elements.

In this case it is advantageous that the linking elements perform not only the function of stiffening or increasing the strength of the attachment body, but at the same time also perform the function of attaching. For example, in the event that the attachment device is used for attaching the steering column to the crossbeam, these linking elements may additionally serve as attachment elements for attaching the bulkhead and/or the windscreen assembly to the crossbeam.

As attachment elements, bushes, threaded pins and/or plate-like elements are preferably used in the crossbeam according to the invention.

Bushes or threaded pins can appropriately be used for fastening the steering column to the crossbeam, these bushes being mounted, as described above, in the gaps between two neighbouring blanks, and plate-like elements can be used as attachment elements for attaching, for example, the bulkhead and/or the windscreen assembly.

As an advantageous configuration, the selection of the number of blanks is governed by the number of attachment elements required. For example, a number of seven neighbouring blanks is entirely sufficient to accommodate four bushes and three blank-like elements as attachment elements distributed in the six gaps thus formed between the blanks, these attachment elements connecting all the blanks to one another and stiffening them against one another in a direction transverse to their longitudinal direction. Preferably, at least three blanks build up the attachment body.

In a further preferred configuration the blanks are connected to one another at a distance from the crossbeam body by at least one bracing element extending substantially parallel to the crossbeam body.

Such a bracing element contributes advantageously to still greater stiffness and strength of the attachment body of the attachment device, although such a bracing element is not required in every case. Such a bracing element is advantageously provided if the blanks have a relatively large longitudinal extension in a direction transverse to the crossbeam body, such that it is possibly insufficient to stiffen the blanks adequately via the attachment elements fastened in the gaps between the blanks.

In a further preferred configuration the blanks are substantially flat. The advantage of this measure is that no forming processes are required in producing the blanks, and the blanks can be produced as punched parts, as is provided in a further preferred configuration.

The blanks may be made from steel sheet, and/or, for the sake of still lighter construction, preferably from a light-metal sheet, in particular aluminium sheet and/or magnesium sheet.

Carbon fibre material is a further material for the blanks which likewise has advantages with regard to weight and strength.

Further advantages and features are apparent from the following description and the appended drawing.

It is self-evident that the features mentioned hereinbefore and hereinafter can be used not only in the particular combination specified but also in other combinations or in isolation without departing from the scope of the present invention.

BRIEF DESCRIPTION OF THE DRAWINGS

An exemplary embodiment of the invention is represented in the drawing and is described in more detail with regard to the drawing, in which.

DETAILED DESCRIPTION OF A PREFERRED EXEMPLARY EMBODIMENT OF THE INVENTION

Figure 1:
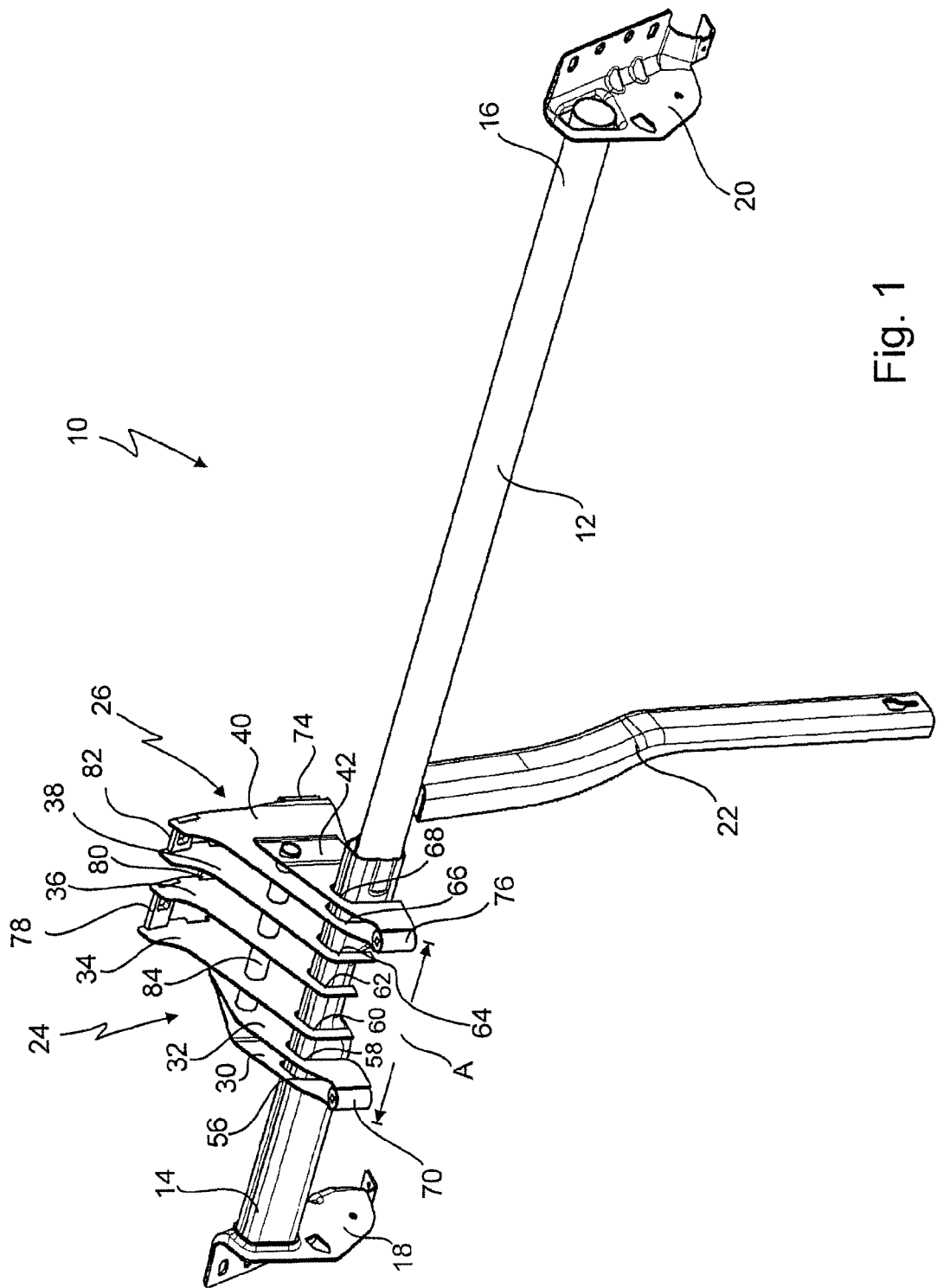
FIG. 1 is an isometric view of a crossbeam according to the invention.

FIGS. 1 to 4 represent a crossbeam for a motor vehicle denoted by the general reference 10. The crossbeam 10 is used in a motor vehicle for stiffening an instrument panel (not shown). The crossbeam 10 is arranged in a motor vehicle in the region below the windscreen between the vertically disposed A-pillars and is fastened thereto.

The crossbeam 10 has a crossbeam body 12 which, in the exemplary embodiment shown, has a tubular overall configuration. The crossbeam body has a first end 14 and a second end 16, respective attachment devices 18 and 20 for attaching the crossbeam 10 to the two A-pillars being present on the first end 14 and the second end 16 of the crossbeam body 12.

In its installed position in a motor vehicle the first end 14 of the crossbeam body 12 is the left-hand end, viewed from the driver, and the second end 16 of the crossbeam body 12 is the right-hand end.

The crossbeam 10 further has an attachment device 22 for attaching the centre control of the motor vehicle to the crossbeam 10.

The crossbeam 10 also has a further attachment device 24 which serves to attach a further vehicle component of the motor vehicle to the crossbeam 10; specifically, the attachment device 24 serves to attach the steering column and, in addition, the bulkhead and/or the windscreen assembly to the crossbeam 10.

Figure 3:
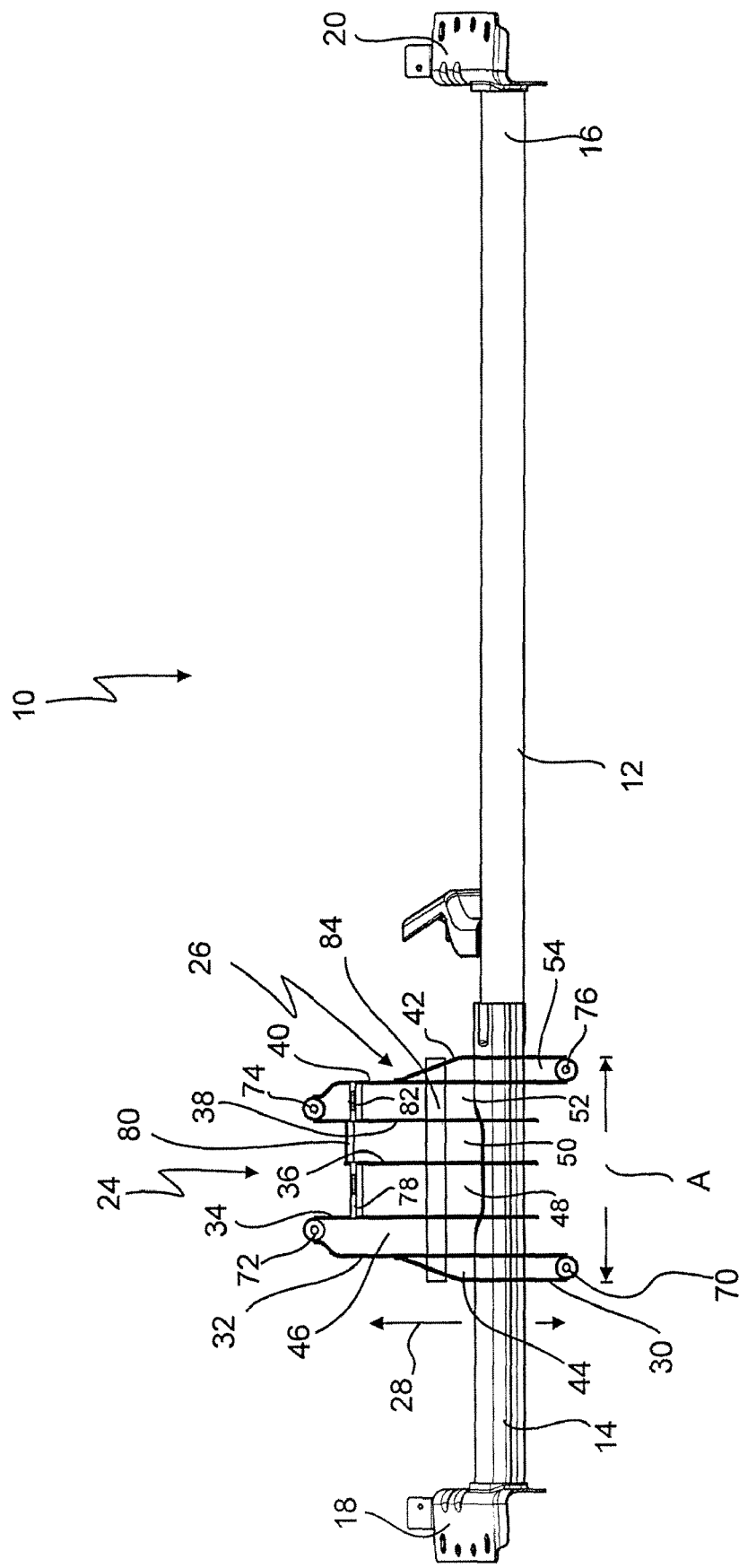
FIG. 3 is a top view of the crossbeam in FIG. 1.
Figure 4:
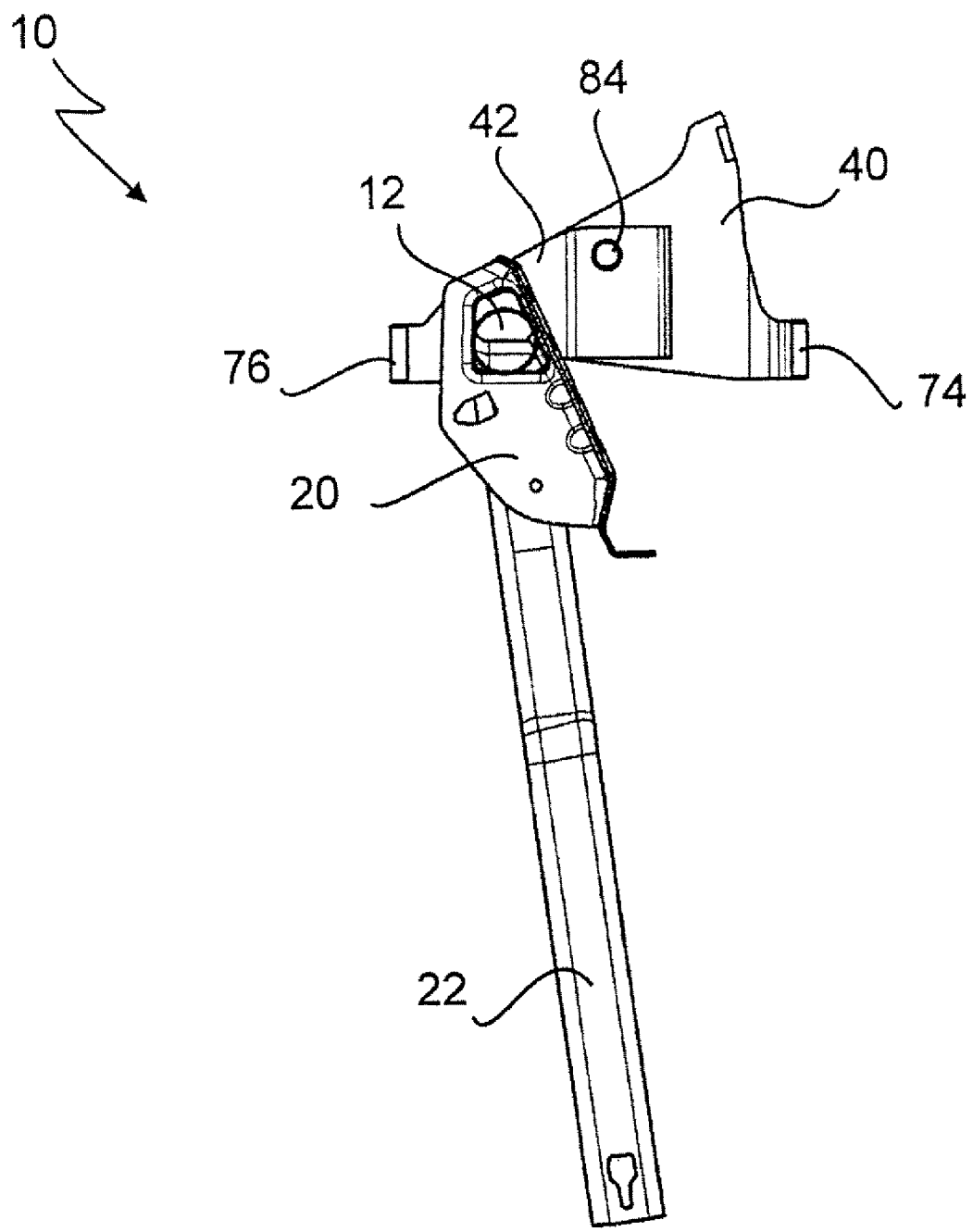
FIG. 4 is a side view of the crossbeam in FIG. 1.

The attachment device 24 has an attachment body 26 which extends in the longitudinal direction of the crossbeam body 12 over a partial length A of the crossbeam body 12, and the attachment body 26 additionally extends in a direction transverse to the longitudinal direction of the crossbeam body 12 away from same, as indicated by a double arrow 28 in FIG. 3.

The attachment body 26 is built up from a plurality of blanks 30, 32, 34, 36, 38, 40 and 42; that is, in the present exemplary embodiment the attachment body 26 is formed from a total of seven blanks 30 to 42. The blanks 30 to 42 are fastened to the crossbeam body 12 in a distributed manner over the partial length A in the longitudinal direction of the crossbeam body 12, and each extend with their longitudinal direction and with their blank area transversely to the longitudinal direction of the crossbeam body 12, as is apparent, in particular, from FIG. 1. In the installed position of the crossbeam 10 in a motor vehicle the blank areas therefore extend substantially vertically.

The blanks 30 to 42 have a material thickness of a few millimeters, preferably in the range from 0.5 mm to 5 mm.

The individual blanks 30 to 42 are substantially flat in the vertical and horizontal directions when in their installed position and, in particular, are produced as punched parts. The outer blanks 30 and 42 have a slight bend and thus are likewise substantially flat. The blanks 30 to 42 may be punched from steel sheet, or they may be produced as punched parts from a light-metal sheet such as aluminium sheet. A further light metal which is possible for producing the blanks 30 to 42 is magnesium sheet.

Yet another material which may be used for producing the blanks 30 to 42 is carbon fibre material.

The blanks 30 to 42 may also in each case be produced from a combination of the aforementioned materials (steel, aluminium, magnesium, carbon fibre).

Figure 2:
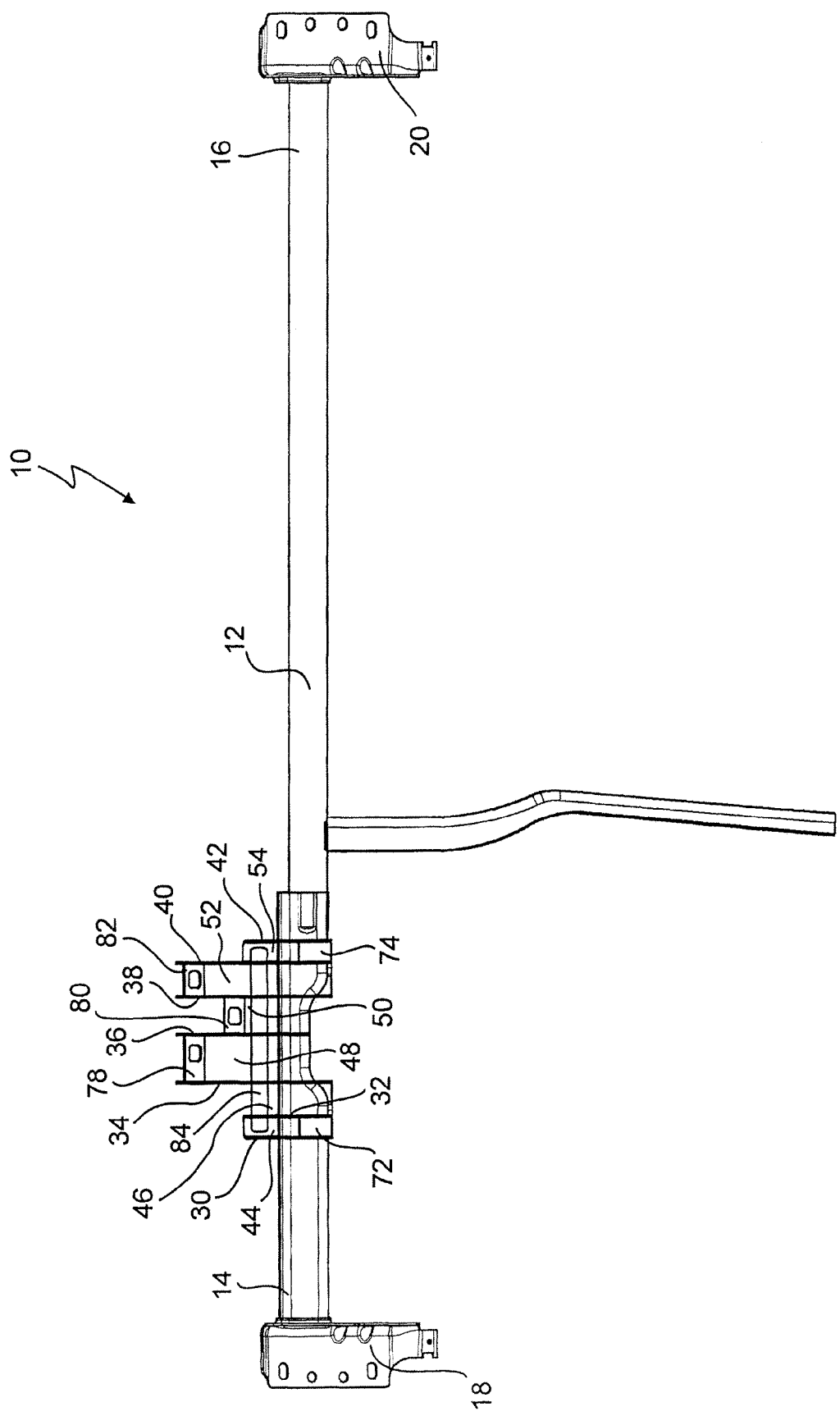
FIG. 2 is a front view of the crossbeam in FIG. 1.

As is apparent in particular from FIGS. 2 and 3, the individual blanks 30 to 42 are each spaced from one another and accordingly form on two sides (top and bottom) open gaps 44, 46, 48, 50, 52 and 54; that is, six gaps 44 to 54 correspond to the number of seven blanks 30 to 42 in the exemplary embodiment shown.

The distance between the individual blanks 30 to 42 is not equal from blank to blank but may be varied according to the factors relating to the installed position of the crossbeam 10 in the motor vehicle, and also for reasons of avoiding resonances during operation of the motor vehicle.

The blanks 30 to 42 are each fastened individually to the crossbeam body 12.

In the exemplary embodiment shown, each of the blanks 30 to 42 additionally has an opening 56, 58, 60, 62, 64, 66 and 68 which is adapted substantially to the outer peripheral shape of the crossbeam body 12 in the region of the partial length A.

Accordingly, the individual blanks 30 to 42 are mounted on the crossbeam body 12 with their respective openings 56 to 68, and the blanks 30 to 42 are fastened to the crossbeam body 12 in the region of the openings 56 to 68. For the fastening thereof all known fastening techniques are possible, in particular bonding, crimping, laser and MAG/MIG welding, CMT welding, screwing, clinching, riveting, etc.

Instead of being open on one side as shown, the openings 56 to 68 may also be fully closed around their periphery. In this case the individual blanks 30 to 42 are fitted on to the crossbeam body 12 from one end for assembly and are then fastened as just described.

In addition, a plurality of first attachment elements 70, 72, 74 and 76 are arranged on the attachment body 26 of the attachment device 24.

The attachment elements 70 to 76 serve to attach the steering column to the crossbeam 10.

The attachment elements 70 to 76 are arranged in the gaps 44, 46 and 52, 54, and specifically are arranged in each case in the region of the free ends of the blanks 30, 32, 34, 38, 40 and 42 oriented away from the crossbeam body 12.

The attachment elements 70 to 76 are in the form of bushes which are provided with an internal thread into which screws can be inserted. As is apparent in particular from FIG. 1, the attachment elements 70 to 76 have a longitudinal extension which makes it possible to fasten the attachment elements 70 to 76 to the blanks 30, 32, 34, 38, 40 and 42 by straight seam welding. However, other joining techniques are also possible. In addition, the attachment elements 70 to 76 in the form of bushes contribute to increasing the stiffness of the attachment body 26 in the direction of the longitudinal direction of the crossbeam body 12, in that they constitute rigid linking elements at the ends of the blanks 30, 32, 34, 38, 40 and 42.

In addition, second attachment elements 78, 80 and 82, which serve to attach the bulkhead and/or the windscreen assembly to the crossbeam 10, are arranged on the attachment body 26. The second attachment elements 78, 80 and 82 are in the form of blank-like elements with holes through which screwing means can pass.

The second attachment elements 78, 80 and 82 are also arranged in gaps between the blanks, specifically in the gaps 48, 50 and 52 between the blanks 34, 36, 38 and 40. Like the first attachment elements 70 to 76, the second attachment elements 78 to 82 have not only the function of attaching but also the function as rigid linking elements for two neighbouring blanks 30 to 42 in each case, on the free ends thereof oriented away from the crossbeam body 12.

To further increase the stiffness of the attachment body 26 of the attachment device 24, the blanks 30 to 42 are optionally connected to one another by a bracing element 84 at a distance from the crossbeam body 12 and substantially parallel thereto. In the exemplary embodiment shown, the bracing element 84 is in the form of a tube or bar, but may have any other suitable profile.

The bracing element 84 is passed through bores provided in the individual blanks 30 to 42 and rigidly connected to the blanks 30 to 42 in the region of these bores by a suitable joining technique; the abovementioned joining techniques may again be used here.

In the simplest case, the bracing element 84 may also be placed on the edges of the blanks 30 to 42 and connected rigidly to the edges by a suitable joining technique as described above.

The attachment body 26, which has as its basic elements the blanks 30 to 42 which are arranged in a spaced and distributed manner in the longitudinal direction of the crossbeam body 12, accordingly has a very largely open and therefore lightweight three-dimensional structure which nevertheless is mechanically stable and can be produced at low cost, and is very flexible with respect to changes of the installed situation of the crossbeam 10 in the event of a model change of the motor vehicle into which the crossbeam 10 is to be installed, both because the number of the blanks 30 to 42 can be varied and because their position on the crossbeam body 12 as well as their geometrical form can be easily changed, since the blanks 30 to 42 can be produced as punched parts. This is because only one work cycle, punching, is needed to produce the blanks 30 to 42 in the form of punched parts. In this way the crossbeam 10 with the attachment device 24 is also especially suitable for trial series with a large number of modified attachment devices 24.

What is claimed is:

1. A crossbeam for a motor vehicle, comprising
   a crossbeam body having a longitudinal axis,
   at least one attachment device arranged at said crossbeam body for attaching at least one vehicle component of said motor vehicle to said crossbeam,
   said attachment device having an attachment body fastened to said crossbeam body and extending in direction of said longitudinal axis of said crossbeam body over a partial length of said crossmember body and away from said crossbeam body in direction transverse to said longitudinal axis,
   a plurality of attachment elements arranged on said attachment body for attaching said at least one vehicle component to said attachment body,
   wherein said attachment body is built up from a plurality of individual blanks which are fastened to said crossbeam body in a distributed manner over said partial length, each of said blanks having a blank area extending transversely to said longitudinal axis of said crossbeam body,
   wherein said plurality of blanks comprise at least three individual blanks, said plurality of blanks forming a ribbed structure of said attachment body,
   wherein two neighboring blanks of said plurality of blanks being connected to one another at free ends oriented away from said crossbeam body of said at least two neighboring blanks by at least one rigid linking element,
   wherein at least one attachment element of said plurality of attachment elements is fastened to said two neighboring blanks of said plurality of blanks in a gap between said two blanks, and
   wherein said at least one linking element is said at least one of said plurality of attachment elements.

2. The crossbeam of claim 1, wherein each blank is fastened individually to said crossbeam body.

3. The crossbeam of claim 1, wherein said blanks are spaced from one another in direction of said longitudinal axis of said crossbeam body.

4. The crossbeam of claim 1, wherein said attachment elements are selected from the group comprised of bushes, threaded pins, plate-like elements.

5. The crossbeam of claim 1, wherein said blanks are connected to one another at a distance from said crossbeam body by at least one bracing element extending substantially parallel to said longitudinal axis of said crossbeam body.

6. The crossbeam of claim 1, wherein said blanks are substantially flat.

7. The crossbeam of claim 1, wherein said blanks are produced as punched parts.

8. The crossbeam of claim 1, wherein said blanks are produced from steel sheet.

9. The crossbeam of claim 1, wherein said blanks are produced from a light-metal sheet.

10. The crossbeam of claim 9, wherein said blanks are produced from aluminium sheet.

11. The crossbeam of claim 9, wherein said blanks are produced from magnesium sheet.

12. The crossbeam of claim 1, wherein said blanks are produced from carbon fiber material.

\* \* \* \* \*